Dec. 17, 1940. A. W. D. BEYER 2,225,253
PLOW DEVICE FOR TRACTORS
Filed April 19, 1940 5 Sheets-Sheet 2

Inventor
Albert W. D. Beyer

By Clarence A. O'Brien

Attorney

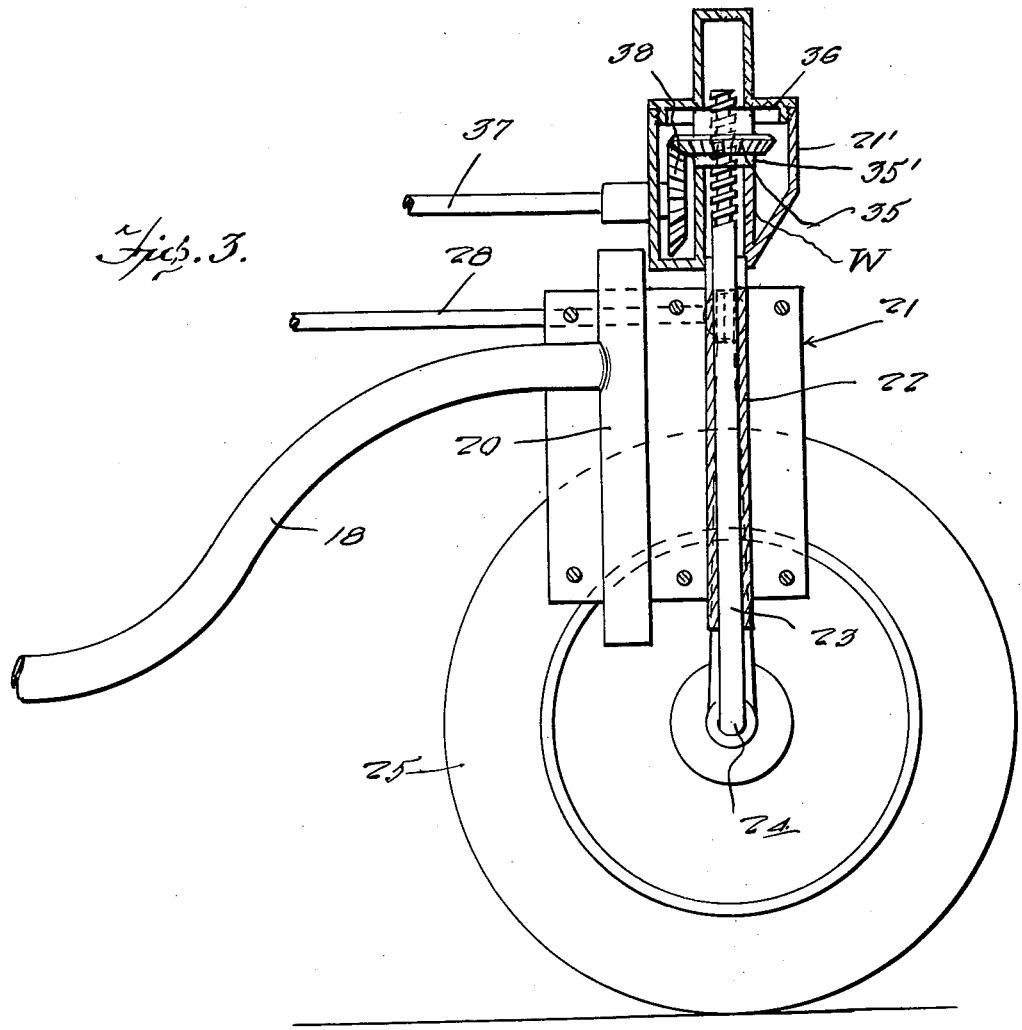
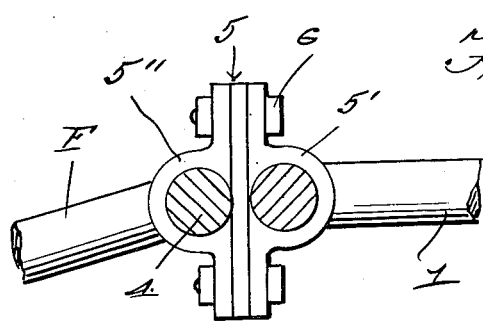

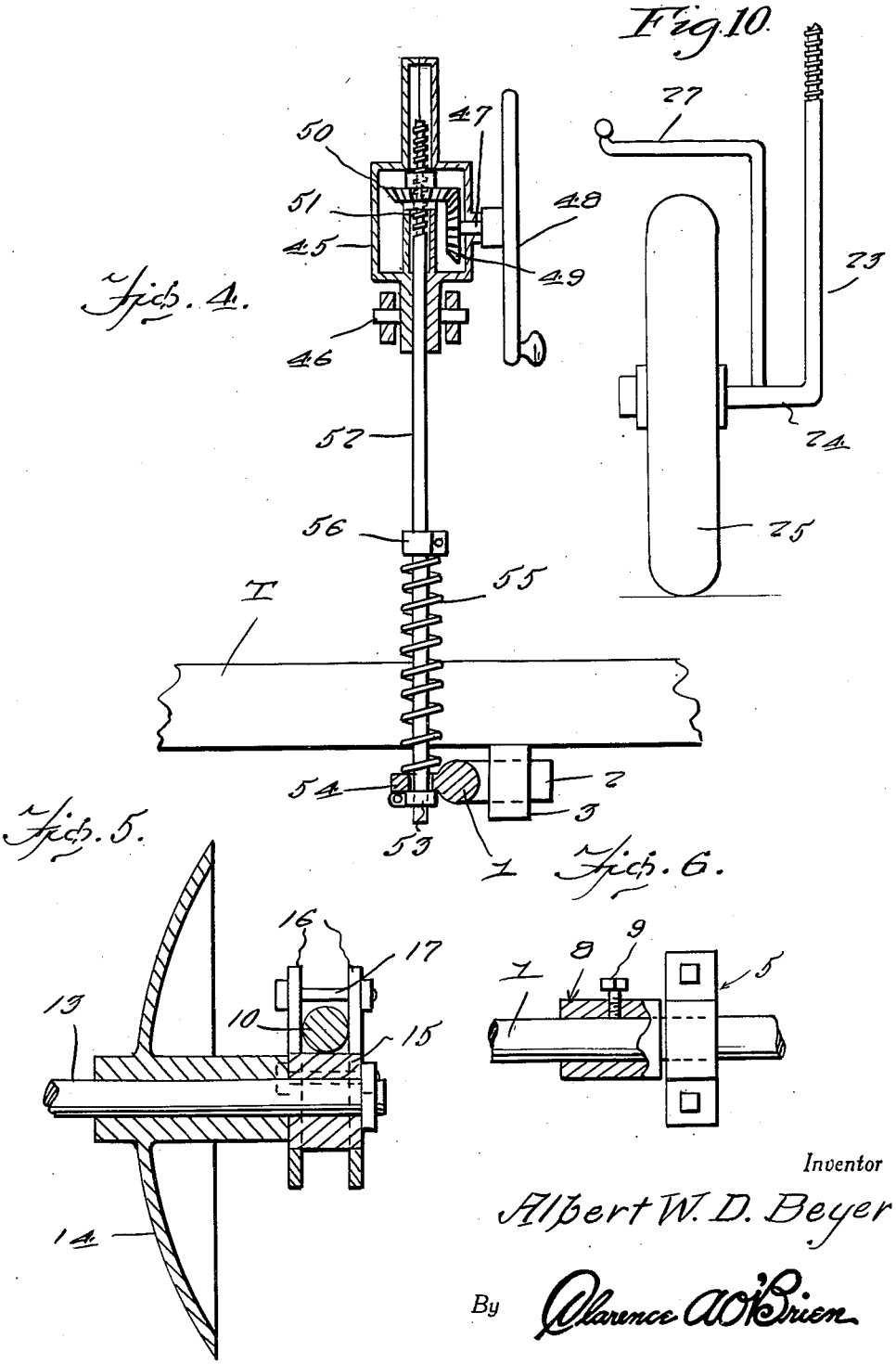

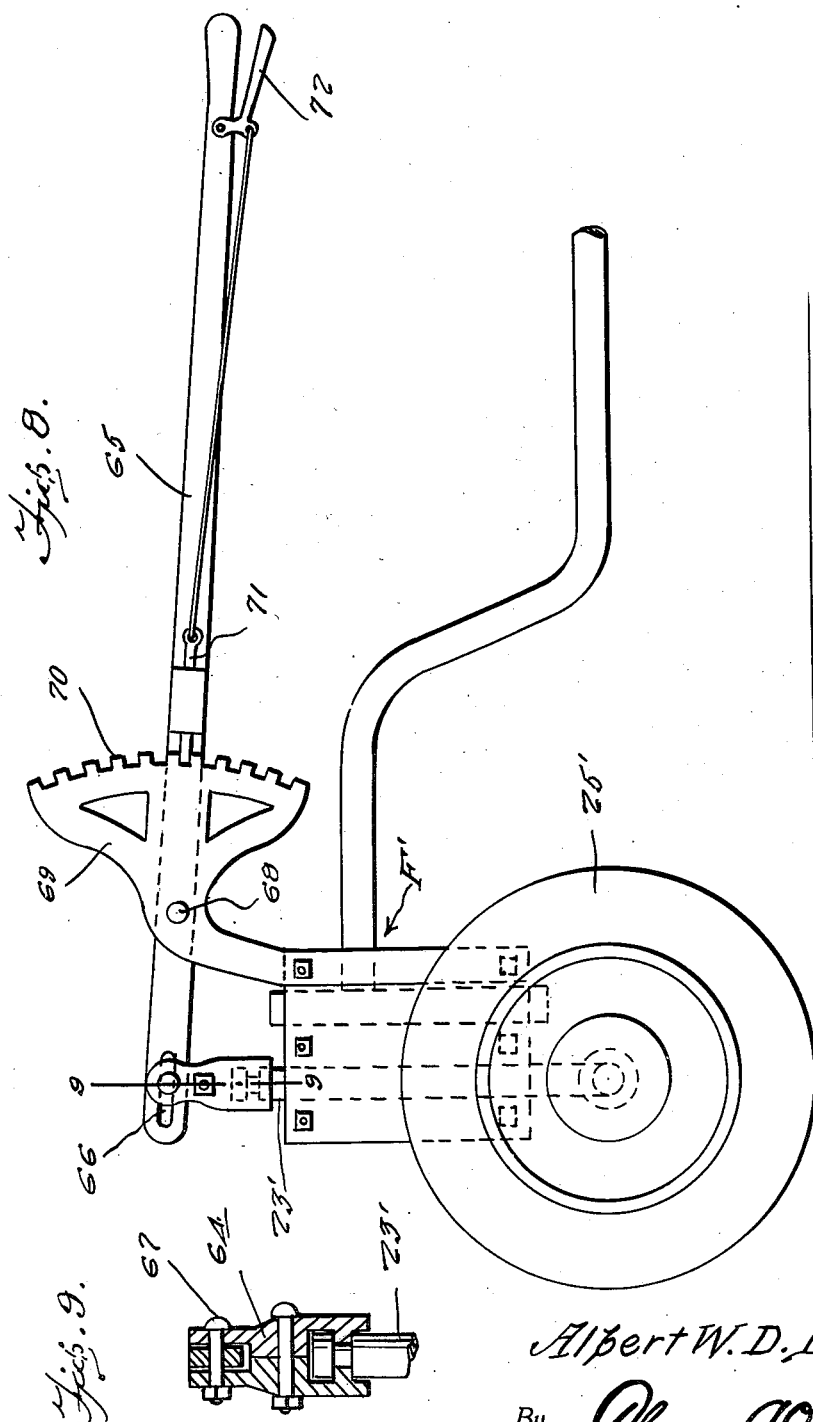

Patented Dec. 17, 1940

2,225,253

UNITED STATES PATENT OFFICE 2,225,253

PLOW DEVICE FOR TRACTORS

Albert W. D. Beyer, Fredericksburg, Tex.

Application April 19, 1940, Serial No. 330,598

2 Claims. (Cl. 97—47)

This invention relates to a plow device adapted to be drawn by a tractor, the general object of the invention being to provide means whereby the plow will plow a plurality of furrows at one time, the tractor having a steadying influence on the plow when attached to the rear of the tractor, and the plow will not interfere with the turning of the tractor nor the backing thereof.

Another object of the invention is to provide a single wheel for the plow device which is automatically turned when the front steering wheel of the tractor is turned and with means whereby the plow device can be raised and lowered.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 3 is a vertical sectional view with parts in elevation showing the supporting means for the wheel of the device.

Figure 4 is a fragmentary vertical sectional view with parts in elevation of the means for adjusting vertically the front part of the device the section being taken on the line 4—4 of Figure 2.

Figure 5 is a section on the line 5—5 of Figure 2.

Figure 6 is a detail view partly in section.

Figure 7 is a section on the line 7—7 of Figure 2.

Figure 8 is a view showing modified means for raising and lowering the wheel of the device.

Figure 9 is a section on the line 9—9 of Figure 8.

Figure 10 is a front view of the rear wheel of Figure 1.

Figure 1:
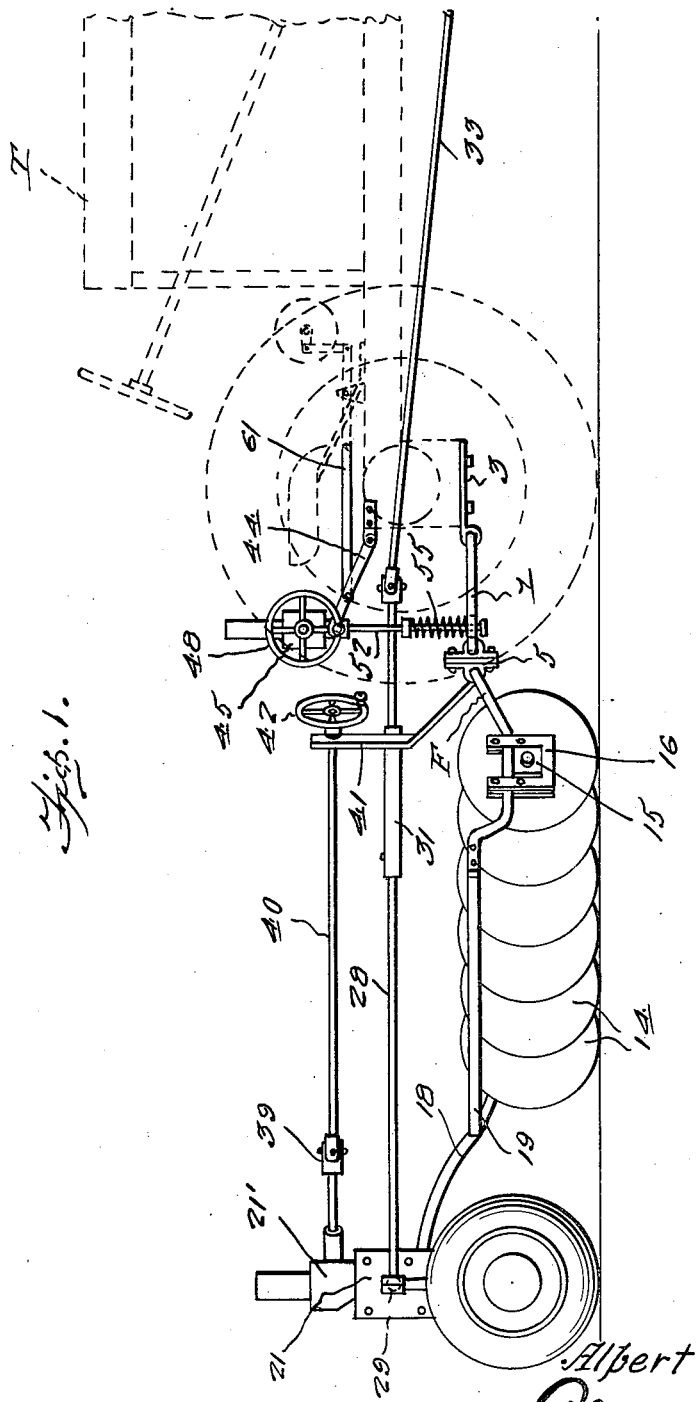
Figure 1 is a side view showing the plow device attached to a tractor with the parts of the tractor in dotted lines.

In these views part of the tractor is shown at T and in carrying out the invention a yoke-shaped frame 1 has the ends of its limbs bent at right angles to form the trunnions 2 which are pivotally connected with a rear part of the tractor by the bearing members 3 so that the frame 1 can move about a horizontal axis at the rear of the tractor. The main frame of the invention is shown at F and includes a straight part 4 which is hingedly connected with the bight of the yoke 1 by the clamping means 5, see Figure 7, each of which includes a member 5' having an opening therein for the passage of the bight of the yoke 1 and a connection member 5'' having an opening therein for the passage of the part 4 of the frame F, the two members being bolted together as shown at 6. A pair of collars 8, see Figure 6, is carried by the bight of the yoke and each collar is held in adjusted position by a set screw 9, these set screws preventing longitudinal movement of the bearing members 5 on the bight of the yoke.

The frame F also includes an outwardly and rearwardly sloping part 10 and a parallel part 11, this part 11 being connected with the part 4 by a diagonal part 12 and the shaft 13 of a gang of disk plows 14 has its ends journaled in the parts 10 and 11 by the bearing members 15, see Figure 5, supported by the hangers 16 from the parts of the frame F, bolts 17 passing through the hangers as shown.

Figure 2:
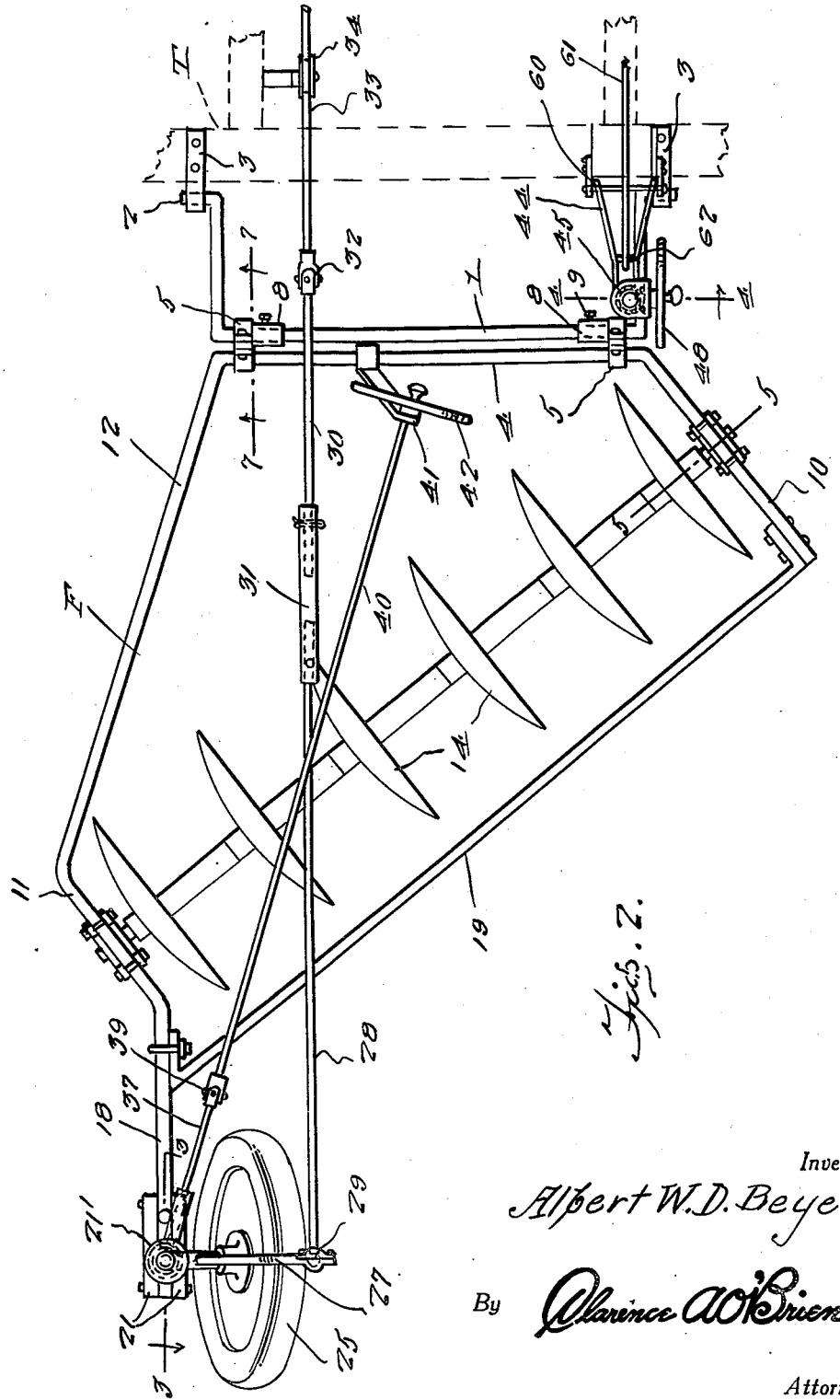
Figure 2 is a top plan view of the device with parts of the tractor in dotted lines.

The part 11 is formed with a rearwardly extending part 18 which is longitudinally arranged with respect to the tractor and a diagonal bar 19 connects this part 18 with the rear end of the part 10. This part 18 is curved as shown more particularly in Figure 3 and is connected to a vertical part 20 to which plates 21 are fastened by bolts or any other suitable manner and said plates have attached thereto a vertically arranged tubular part 22 for receiving the post 23 which has its lower end bent to form the spindle 24 for the wheel 25, the spindle holding the wheel at an inclination as shown in Figure 2.

An arm 27 is connected with the spindle 24, see Figure 10 and is of angle shape and a rod 28 is connected to the outer end of this arm by a universal joint 29. The rod 28 is adjustably connected to a rod 30 by the tubular member 31 and a universal joint 32 connects the rod 30 with a rod 33 which passes over a grooved wheel 34 at the rear of the tractor and said rod is connected with the front steering wheel of the tractor so that as this steering wheel is turned to cause the tractor to make a turn the rod assembly will turn the post 23 through means of the arm 27 and thus turn the wheel 25 to make this wheel cause the plow device to follow the turning movement of the tractor. A housing 21' is suitably supported from the assembly 21—22 and in this housing is rotatably supported a beveled gear 35 which has a threaded bore passing through the center for receiving the threaded upper end 36 of the post 23. A shaft 37 enters the housing and has attached thereto a beveled gear 38 which meshes with the gear 35. The webs W in the housing 21' support the hub 35' of the gear 35. A universal joint 39 connects the shaft 37 with a shaft 40, the front of which is journaled on a bracket 41 attached to the frame F and a hand wheel 42 is connected with the front end of the shaft 40 so that it can be turned manually which results in turning movement of the gear 35 so that the post is moved downwardly or upwardly in accordance with the direction of turning movement of the gear 35 and this, of course, raises or lowers the wheel 25 and, therefore, the rear part of the frame F.

A frame 44 is connected to the rear part of the tractor and carries a housing 45, see Figure 4, with the housing pivotally supported at its lower end in the frame as shown at 46. A stub shaft 47 extends into the housing and is journaled therein and a hand wheel 48 is connected to the outer end of the shaft and a beveled gear 49 is connected to the inner end thereof. This gear 49 meshes with a beveled gear 50 supported for rotary movement in the housing 45 and having a threaded bore through which the threaded part 51 of a shaft 52 passes so that when the gear 50 is turned by turning of the wheel 48 the shaft 52 is raised or lowered. This shaft 52 has a split collar 53 at its lower end with the lower end of the shaft passing through a hole in a lug 54 attached to a part of the yoke I. A spring 55 encircles the lower part of the shaft or rod 52 and has its lower end bearing against the lug 54 and its upper end against a collar 56 on the shaft. Thus by turning the wheel 48 the shaft 52 can be raised and lowered to move the yoke I on its pivotal points and by turning the wheel 42 the ground wheel 25 will be raised and lowered and thus the depth of plowing can be regulated by turning the hand wheels and due to the worm drive the parts will remain in the position to which they have been adjusted. The spring 55 will permit the parts to raise when the plows strike an obstruction without damaging the parts. Also by adjusting the collars or sleeves 8 the frame F can be adjusted toward one side or the other to regulate the position of the plow gang.

As will be seen the frame 44 is hingedly connected at the front end to the rear part of the tractor as shown at 60 and a rod 61 is connected with a rear part of the frame 44 as shown at 62 and this rod 61 extends forwardly and is connected in any suitable manner with the power lift of the tractor so that the frames I and F can be swung upwardly to raise the plows off the ground, thus permitting the device to be transported from place to place without the plows touching the surface over which the tractor is traveling. This is also desirable in making turns at the end of a field.

Figures 8 and 9 show a modification for raising and lowering the rear wheel 25' and as shown in these figures the post 23' of the rear wheel has a clevis 64 rotatably connected with the upper end and a hand lever 65 has its rear end provided with a slot 66 and said rear end enters a notch in the upper end of the clevis with a bolt 67 passing through the notch and the slot 66 for connecting the lever with the clevis. The lever is pivoted at 68 to a bracket 69 supported from the rear part of the frame F' and this bracket is formed with a quadrant 70 for receiving the detent 71 of the lever which is moved by a small lever 72. Thus by manipulating the lever 65 the clevis will be caused to raise or lower the post 23' to raise and lower the wheel 25'.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In combination with a tractor, a first frame connected with the rear of the tractor for movement about a horizontal and transversely arranged axis, a plow frame having a horizontal part, means for hinging the horizontal part to the rear part of the first frame, means for adjusting the plow frame sidewise on the first frame, plows carried by the plow frame, manually operated means for raising and lowering the first frame, an extension of the plow frame at the rear thereof, a post rotatably supported in the extension, a spindle carried by the post, a wheel on the spindle, an arm on the post, means for connecting the arm with the steering mechanism of the tractor to turn the post when the tractor is turned, manually operated means for raising and lowering the post and means for raising and lowering the first frame.

2. In combination with a tractor, a first frame connected with the rear of the tractor for movement about a horizontal and transversely arranged axis, a plow frame having a horizontal part, means for hinging the horizontal part to the rear part of the first frame, means for adjusting the plow frame sidewise on the first frame, plows carried by the plow frame, manually operated means for raising and lowering the first frame, an extension of the plow frame at the rear thereof, a post rotatably supported in the extension, a spindle carried by the post, a wheel on the spindle, an arm on the post, means for connecting the arm with the steering mechanism of the tractor to turn the post when the tractor is turned, manually operated means for raising and lowering the post and means for raising the first frame from a power part of the tractor, the means for raising and lowering the post and the manual means for raising and lowering the first frame each including worm mechanism.

ALBERT W. D. BEYER.